May 28, 1940.  A. DAUM  2,202,094
FASTENER FOR JOINING BELTS AND CONVEYER BANDS
Filed June 8, 1938
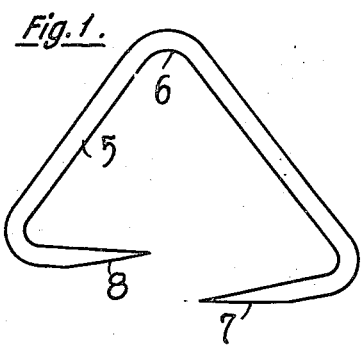
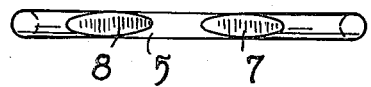
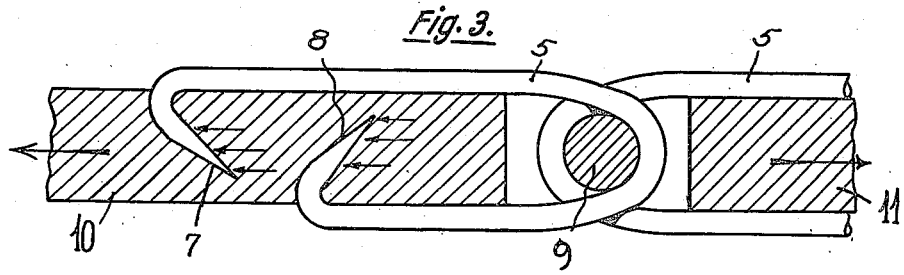
INVENTOR:
AUGUST DAUM,
by Carl A. Hellmann,
Attorney.

Patented May 28, 1940

2,202,094

UNITED STATES PATENT OFFICE 2,202,094

FASTENER FOR JOINING BELTS AND CONVEYER BANDS

August Daum, Dusseldorf, Germany

Application June 8, 1938, Serial No. 212,587
In Germany July 27, 1937

1 Claim. (Cl. 24—33)

This invention relates to fasteners for joining belts and conveyer bands.

For this purpose fasteners have previously been employed which consist of a wire which is bent into the form of an open triangle and of which the ends are pointed by oblique cuts. In use the pointed ends of these fasteners are pressed into the belt or band to be joined in such a way that the two arms which were originally inclined at an angle to one another lie on or in the surface of the belt or band and form projecting eyes between which engage the eyes formed by the fasteners which are pressed into the other end of the belt in a similar manner. The parts to be connected are then joined together by means of a pin which is passed through the eyes.

In the known fasteners the ends of the wire are cut obliquely in such a way that the cut surfaces lie approximately in the plane of the two arms of the fastener. When these fasteners are pressed into the ends of the belt or band in the manner described the cut ends cut the belt or band like a knife or saw both when the fastener is being pressed in and also when the fastener is stressed so that the belt or band is quickly destroyed. It has therefore previously been proposed to grind the pointed ends into conical form. This is clumsy and expensive and further the formation of sharp edges is not thereby avoided with certainty. When the pointed ends are ground any grooves which may remain act in the same way as the cut edges and cut into the belt in the direction in which the power is transmitted and thereby shorten its life.

Now the present invention relates to a fastener for belts and conveyer bands which consists of a wire which is bent into the form of an open triangle by which the aforesaid disadvantages are obviated. According to the invention, the pointed ends are formed by oblique cuts which, when the fastener is open, run at right angles or approximately at right angles to the plane passing through the arms of the fastener. When the fastener is pressed into the ends of the belt to be joined the tensile stress then always acts on smooth and uncut surfaces. Thus, for example, if the fasteners are made from wire of circular cross section the tensile stress acts on the smooth-drawn circular surface of the wire.

It may be also advantageous in some cases to bend the pointed ends inwardly. If the pointed ends are bent in this way the fastener is particularly well adapted for the transmission of power.

A fastener for belts and conveyer bands constructed in accordance with the invention is illustrated by way of example in the accompanying drawing, in which Fig. 1 is a face view of the fastener, before it is introduced into the belt;

Fig. 2 is a side view corresponding to Fig. 1; and

Fig. 3 is a fragmentary partly sectional diagrammatic view, showing the fastener after it has been forced into the end of the belt, the end portions of which are shown in section.

In the new fastener 5, pointed ends are formed by oblique cuts made in such a manner that the cut surfaces 7 and 8 are at right angles or approximately at right angles to the plane passing through the arms of the fastener. It will be seen that when the pointed ends of the fastener 5 have cut surfaces 7 and 8 which run at right angles to the plane in which the arms of the fastener are situated the conditions are favorable to long life of the joint in the belt, inasmuch as in this case the tensile stress which is indicated by the arrows in Figure 3 acts on the uncut surfaces, so that the material of the belt or band is not damaged even when the load is heavy.

As previously stated it may also be advantageous to bend the pointed ends of the fastener inwardly in order to obtain a particularly favorable distribution of the stress; and it is also possible to press the new fastener so far into the ends of the belt that its points project out of the belt. The pointed projecting ends can then be turned down so that they lie against the upper and under surfaces of the belt. The projecting ends could also be bent back into the belt.

It will be understood, of course, that the fastener 5, which is originally of a substantially triangular shape, when in use is bent around the pins or shafts 9, the bend being made at the point 6 of the fastener, when used to join the ends 10 and 11 of the belt.

I claim:

A belt fastener consisting of wire of substantially circular cross section, having two legs connected by a bend, the fastener having inwardly extending ends, each end being sharp and consisting of a substantially plane surface oblique to the axis of the wire and substantially perpendicular to the general plane of the fastener, and located on the side remote from the bend, that portion of each end opposite said flat part being substantially cylindrical.

AUGUST DAUM.